(12) United States Patent
Banks et al.

(10) Patent No.: US 7,836,014 B2
(45) Date of Patent: Nov. 16, 2010

(54) HYBRID REAL-TIME DATA REPLICATION

(75) Inventors: Justin Banks, St. Louis Park, MN (US); Abderrahman Aba A. El Haddi, Chaska, MN (US); Paul A. Sustman, Shorewood, MN (US); Victor T. Lee, Jr., White Bear Lake, MN (US)

(73) Assignee: BakBone Software, Inc., San Diego, CA (US)

( * ) Notice: Subject to any disclaimer, the term of this patent is extended or adjusted under 35 U.S.C. 154(b) by 596 days.

(21) Appl. No.: 10/980,875

(22) Filed: Nov. 3, 2004

(65) Prior Publication Data

US 2005/0149578 A1    Jul. 7, 2005

Related U.S. Application Data

(60) Provisional application No. 60/517,253, filed on Nov. 4, 2003.

(51) Int. Cl.
*G06F 17/00* (2006.01)
*G06F 7/00* (2006.01)

(52) U.S. Cl. .................. 707/611; 707/613; 707/640; 707/661

(58) Field of Classification Search .............. 707/204
See application file for complete search history.

(56) References Cited

U.S. PATENT DOCUMENTS

| 5,295,075 | A | * | 3/1994 | Korner et al. | 700/186 |
| 5,353,232 | A | * | 10/1994 | Vollmayr | 700/187 |
| 5,434,793 | A | * | 7/1995 | Korner | 700/189 |
| 5,819,020 | A | | 10/1998 | Beeler, Jr. | |
| 5,920,725 | A | * | 7/1999 | Ma et al. | 717/171 |

(Continued)

FOREIGN PATENT DOCUMENTS

WO    WO01/35244    5/2001

OTHER PUBLICATIONS

Notification of transmittal of the International Search Report and the Written Opinion of the International Searching Authority for PCT/US2004/036474, dated Sep. 12, 2005 (14 pages).

(Continued)

*Primary Examiner*—Greta L Robinson
*Assistant Examiner*—James J Wilcox
(74) *Attorney, Agent, or Firm*—Winstead PC

(57) ABSTRACT

Techniques are described for replicating data from one to one or more heterogeneous data processing or communication devices for the purpose of remote backup, redundancy, content distribution, communications, observations or measurements. In a first phase, the attributes of the data that are modified or created on a device or that are passing through the device are tracked and journaled in volatile or non-volatile storage in real-time. In a second phase, the attributes that match patterns pre-specified in a configuration are used to determine which data to replicate and which modifications to make the devices. In a third phase, the data is replicated. In a preferred embodiment, the described techniques comprise an application that runs on a host device or is embedded in a logic or memory device. The described invention is designed to be transparent for system redundancy and error recovery processes such as error correction, re-transmission on links, and raid configuration.

21 Claims, 12 Drawing Sheets

U.S. PATENT DOCUMENTS

| | | | |
|---|---|---|---|
| 5,974,563 | A | 10/1999 | Beeler, Jr. |
| 6,442,748 | B1 * | 8/2002 | Bowman-Amuah ......... 717/108 |
| 6,496,908 | B1 | 12/2002 | Kamvysselis et al. |
| 6,539,396 | B1 * | 3/2003 | Bowman-Amuah ..... 707/103 R |
| 6,898,609 | B2 * | 5/2005 | Kerwin ....................... 707/203 |
| 6,937,730 | B1 | 8/2005 | Buxton |
| 7,130,870 | B1 * | 10/2006 | Pecina et al. ................ 707/203 |
| 7,233,975 | B1 * | 6/2007 | Gerraty et al. .............. 709/213 |
| 2003/0014433 | A1 | 1/2003 | Teloh et al. |
| 2004/0133591 | A1 * | 7/2004 | Holenstein et al. .......... 707/102 |
| 2006/0059511 | A1 | 3/2006 | Nocifera et al. |
| 2007/0038823 | A1 | 2/2007 | Banks |

OTHER PUBLICATIONS

A.A. El Haddi et al., "Using Distributed File Replication for Business Continuance and Content Distribution," www.constantdata.com, Feb. 2003, 6 pgs.

A.A. El Haddi et al., "Using File replication for business continuance and content distribution.", www.constantdata.com, May 2003, (8 pages).

Gladney, H.M., "Data Replicas in Distributed Information Services", ACM Transactions on Database Systems, vol. 14, No. 1, Mar. 1989, pp. 75-97.

Nordin, Brent, et al., "Remote Operations Across a Network of Small Computers", ACM, 1986, pp. 110-114.

Adusumilli, Panduranga Rao, et al., "An Integrated Solution for Managing Replicated Data in Distributed Systems", ACM, 1993, pp. 351-357.

Kahane, Yehuda, et al., "Computer Backup Pools, Disaster Recovery, and Default Risk", Communications of the ACM, Jan. 1988, vol. 31, No. 1, pp. 78-83.

Ma, Chaoying, "On Building Very Large Naming Systems", Cambridge University Computer Lab, pp. 1-5.

Herlihy, Maurice, "Taking Concurrency Seriously", 2 pages.

Birman, Kenneth P., "Replication and Fault-Tolerance in the ISIS System", ACM, 1985, p. 79-86.

Liskov, Barbara, et al., "A Replicated Unix File System", Jul. 31, 1990, (9 pages).

Mullender, Sape J., et al., "Simulating Wide-area Replication", 1994, (8 pages).

McDermott, John, P. et al., "A Single-Level Scheduler for the Replicated Architecture for Multilevel-Secure Databases", (10 pages).

Liskov, Barbara, et al., "Replication in the Harp File System", ACM, 1991, pp. 226-238.

Ladin, Rivka, et al., "Lazy Replication: Exploiting the Semantics of the Distributed Services", ACM, 1990, pp. 43-57.

Joseph, Thomas A., et al., "Low Cost Management of Replicated Data in Fault-Tolerant Distributed Systems", ACM Transactions on Computer Systems, vol. 4, No. 1, Feb. 1986, pp. 54-70.

Birrell, Andrew D., et al., Grapevine: An Exercise in Distributed Computing, Communications of the ACM, Apr. 1982, vol. 25, No. 4, pp. 260-274.

Ruan, Zuwang, et al., "Performance Analysis of File Replication Schemes in Distributed Systems", ACM, 1987, pp. 205-215.

Kim, Won, "Highly Available Systems for Database Applications", Computing Surveys vol. 16, No. 1, Mar. 1984, (28 pages).

Garcia-Molina, Hector, et al., "The Cost of Data Replication", pp. 193-198.

Ladin, Rivka, et al., "Providing High Availability Using Lazy Replication", ACM Transactions on Computer Systems, vol. 10, No. 4, Nov. 1992, pp. 360-391.

Bhide, Anupam, et al., "An Efficient Scheme for Providing High Availability", ACM SIGMOD, 1992, pp. 236-245.

Pu, Calton, et al., "Replica Control in Distributed Systems: An Asynchronous Approach", ACM, 1991, pp. 377-386.

Mellor-Crummey, John, et al., "Synchronization Without Contention", ACM, 1991, pp. 269-278.

Goldring, Rob, "Things every update replication customer should know", ACM, 1995, pp. 439-440.

Polyzois, Christos A., et al., "Evaluation of Remote Backup Algorithms for Transaction-Processing Systems", ACM Transactions on Database Systems, vol. 19, No. 3, Sep. 1994, pp. 423-449.

Ivinskis, Kestutis, "High Availability of Commercial Applications", ACM, 1995, pp. 433-434.

King, Richard, P., et al., "Management of a Remote Backup Copy for Disaster Recovery", ACM Transactions on Database Systems, vol. 16, No. 2, Jun. 1991, pp. 338-368.

Kumar, Akhil, et al., "Cost and availability tradeoffs in replicated data concurrency control", ACM Transactions on Database Systems (TODS), vol. 18, Issue 1, Mar. 1993, (5 pages).

Bhide, Anupam et al., "An efficient scheme for providing high availability", The Guide to Computing Literature, 1992, (4 pages).

Polyzois, Christos et al., "Evaluation of Remote Backup Algorithms for Transaction Processing Systems", ACM SIGMOD, 1992, pp. 246-255.

Jensen, David W., et al., "File Archive Activity in a Supercomputing Environment", ACM, 1993, pp. 387-396.

Olken, Frank, "HOPT: A Myopic Version of the STOCHOPT Automatic File Migration Policy", ACM, 1983, pp. 39-43.

Weinstein, Matthew J., et al., "Transactions and Synchronization in a Distributed Operating System", ACM, 1985, pp. 115-126.

Awerbuch, Baruch et al., "Competitive Distributed File Allocation", ACM STOC, May 1993, pp. 164-173.

Sandhu, Harjinder S., et al., "Cluster-Based File Replication in Large-Scale Distributed Systems", Performance Evaluation Review, vol. 20, No. 1, Jun. 1992, pp. 91-102.

Andrews, Gregory R., "Paradigms for Process Interaction in Distributed Programs", ACM Computing Surveys, vol. 23, No. 1, Mar. 1991, pp. 82-90.

Alsberg, Peter A. et al., "A Principle for Resilient Sharing of Distributed Resources", pp. 562-570.

Wiebe, Douglas, "A Distributed Repository for Immutable Persistent Objects", ACM, Sep. 1986, pp. 453-465.

Gray, Jim, "Why Do Computers Stop and What Can Be Done About It?", Technical Report 85.7, Jun. 1985, pp. 1-35.

* cited by examiner

HYBRID REAL-TIME DATA REPLICATION

This application claims the benefit of U.S. Provisional Application Ser. No. 60/517,253, filed Nov. 4, 2003, the entire content of which is incorporated herein by reference.

TECHNICAL FIELD

The invention relates to replication of data and, more particularly, replication of data from one to one or more heterogeneous data processing and/or communication devices.

BACKGROUND

Data replication is used to protect data from loss, to ensure business continuity and to distribute data to all points of use while keeping the total cost of ownership down. Data replication requires making copies of data from a source device to one or more target devices. Target devices can reside on the same host or can be remotely located on multiple hosts. Data replication is performed for several reasons including device synchronization, disaster recovery planning and business continuance, content distribution, backup consolidation and server migration.

Safeguarding corporate data is of primary importance. Disaster can result from electrical outages, natural disasters such as floods, tornadoes, human caused disasters such as fires, and other such events that can cause physical loss of information technology (IT) infrastructure and the data it houses. Several steps have conventionally been taken to protect corporate data assets from such events. These often include utilization of offsite backups combined with mirroring technologies, fault tolerant hardware, and data replication.

Delivering data when needed to the points where it is used can be costly and challenging. The points of use may be multiple web servers, computational cluster nodes, spatially distributed points of ingestion by database engines, collaborative servers, data brokers, data resellers, distance learning end points, communication devices, display devices, archival or backup service points. Another user for data replication is to distribute content to use locations where it is needed.

SUMMARY

In general, the invention is directed to techniques that allow real-time data replication from one to one or more heterogeneous data processing devices. In particular, hybrid real-time data replication techniques are described that capture all data changes synchronously while performing replication asynchronously. The described hybrid real-time data replication techniques combine replication of modified and pass-through data.

Unlike conventional data replication techniques, which perform either synchronous or asynchronous data replication, the described hybrid real-time data replication techniques allow data integrity to be preserved while eliminating the limits due to latency and network fault sensitivity imposed by synchronous data replication over long haul networks. The described techniques extend to computer devices as well as intelligent devices, such as embedded storage devices, flash memories, cell phones, displays, cameras, medical imaging apparatuses or other such intelligent devices. Additionally, the described techniques are not limited to the source and destination devices being of the same type, architecture or configuration.

The described techniques can be used for both business continuance and content distribution. For example, the described techniques can be used to replicate data between two servers in a 1:1 uni-direction or bi-directional configuration or from one host to one or more hosts simultaneously in a 1:N configuration. Additionally, the described techniques provide a solution for business continuance, content distribution, and backup consolidation. In particular embodiments, the described techniques that replicates data to various versions of UNIX including Solaris, HP-UX, IBM AIX, and LINUX.

In one embodiment, the invention is directed to a data replication method comprising accepting a request from a client device to modify data, adding data attributes of the modified data to a message queue, saving the data attributes of modifications on a storage device, performing modifications and saving a status of the data modification operation, and communicating the status of the operation to the client device if the client device requests that the status be communicated.

In another embodiment, the invention is directed to a machine-readable medium containing instructions. The instructions cause a programmable processor to accept a request from a client device to modify data, add data attributes of the modified data to a message queue, save the data attributes of modifications on a storage device, perform modifications and saving a status of the data modification operation, and communicate the status of the operation to the client device if the client device requests that the status be communicated.

In yet another embodiment, the invention is directed to a system for replication of data across a distributed computing system, the system comprising a pass-through component and a data replication engine. The pass-through component intercepts data modification requests and the data replication engine receives the data modification requests from the pass-through component and replicates the modifications on one or more remote storage devices by accepting a request from a client device to modify data through the pass-through component, adding data attributes of modified data to a message queue, saving the data attributes on one or more of the storage devices, performing modifications and saves a status of the data alteration operation, and communicating the status of the operation to the device that requested the change if the device requests that the status be communicated.

The invention may be capable of providing one or more advantages. For example, the invention provides techniques for real-time data replication from one to one or more heterogeneous data processing devices. Unlike conventional data replication techniques that require that the source and destination devices be of the same type and architecture or at least have the same configuration, the described techniques allow data replication for devices such as computers, storage devices, communication devices, sensor devices, observation and measurement devices that are capable of sending and receiving data to and from other similar or dissimilar devices. Moreover, the described techniques capture all data changes synchronously while performing replication asynchronously. Furthermore, the described techniques combine replication of changed and pass-through data.

Additionally, the described techniques advantageously provide data replication for safeguarding customer data for business continuance and disaster recovery by consolidating backups and building backup appliances. The described techniques may also automate content distribution. Consequently, the described techniques may reduce the total cost of ownership of an organization's data while offering maximum protection and high availability without substantially impacting performance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
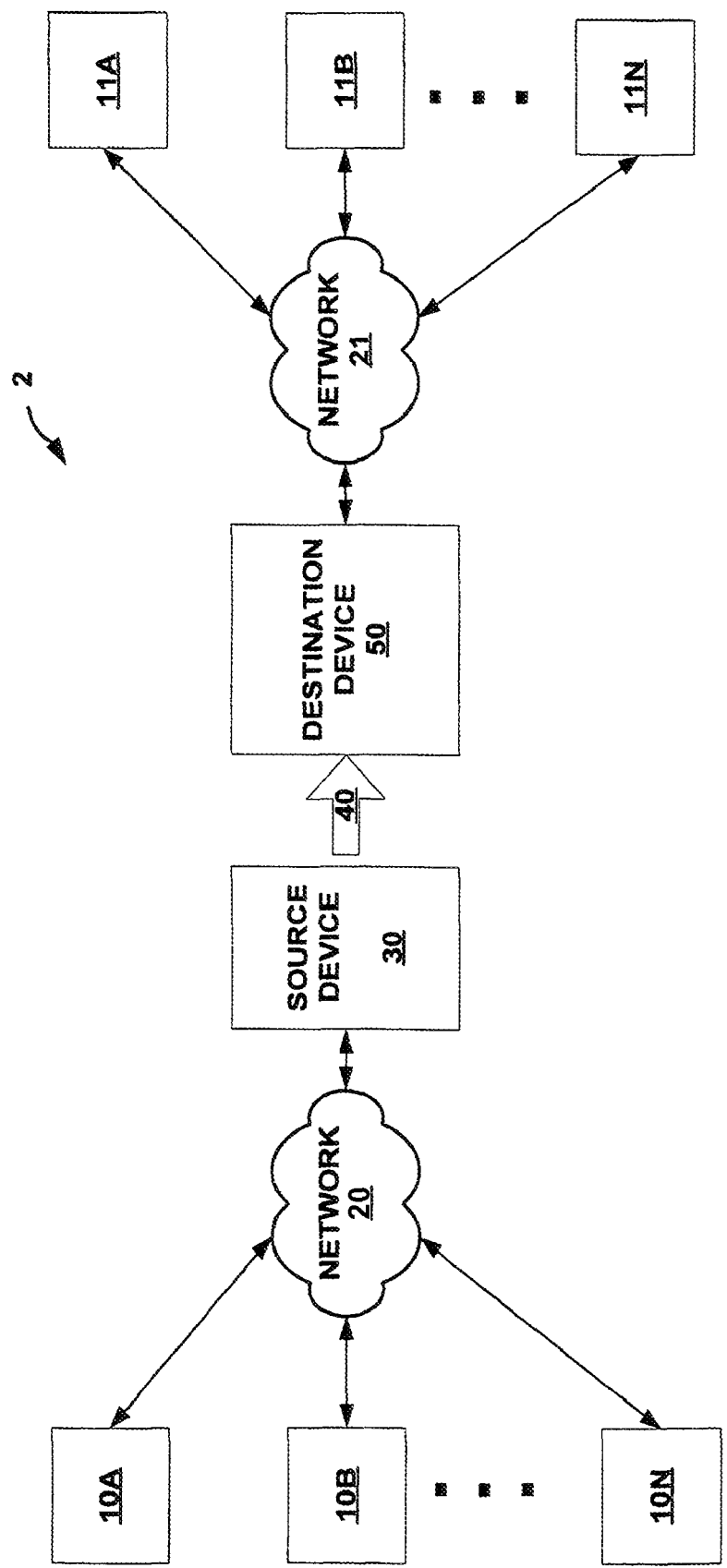
FIG. 1 is a block diagram illustrating hybrid real-time data replication in a single source device and a single destination device configuration according to an embodiment of the present invention.

FIG. 1 is a block diagram illustrating an example operating environment 2 in which an example configuration of the present invention is implemented. In the illustrated embodiment, a source device 30 is connected to client devices 10A-10N, hereafter collectively referred to as client devices 10, via a network 20. Source device 30 replicates data 40 modified, created by, or passing through source device 30 to a destination device 50.

Destination device 50 is optionally connected to a set of client devices 11A-11N, hereafter collectively referred to as client devices 11, via network 21. In general, one or more client devices 10 modifies or creates the content on source device 30 or, alternatively, sends data 40 to another one or more of client devices 10 by passing data 40 through source device 30. The data modifications that occur on source device 30 or pass through source device 30 are replicated to destination device 50. Consequently, data replication from one to one or more heterogeneous data processing devices is achieved by capturing all data changes synchronously while performing replication asynchronously. As such, the data replication techniques described herein enable data synchronization and/or distribution of data content from one to one or more similar or dissimilar devices. Alternatively, the data replication techniques described here enable data synchronization and/or distribution of data within the same device.

Client devices 10 and 11 may be any one or combination of data processing devices including storage devices, flash memories, cell phones, cameras, medical imaging apparatuses, and other such communication, observation and measurement devices capable of sending and receiving data to and from other data processing devices. Each of networks 20 and 21 may be any type of network including satellite, wireless, packet radio, leased lines, Ethernet, ATM, DSL, broadband, and any other network capable of transmitting data between client devices 10 and 11.

The hybrid real-time data replication techniques are configured to run as an application on source device 30 or, alternatively, destination device 50. In a preferred embodiment, source device 30 and destination device 50 are host computer devices running various versions of UNIX or other operating systems including LINUX, Solaris, HP-UX, IBM, and AIX. However, source device 30 and destination device 50 are not limited to devices being the of the same type and architecture or have the same configuration. Additionally, the hybrid real-time data replication system may also be embedded in a logic device and memory device such as EEPROM or gate arrays in addition to other hardware, firmware, and software based implementations. Those skilled in the art will realize that that example environment 2 is merely illustrative of one exemplary configuration of the use of the invention, and that alternative configurations may be used without departing from the scope of the present invention.

For example, in the illustrated 1:1 configuration, the described hybrid real-time data replication techniques can be used to replicate data between two servers, i.e., source device 30 and destination device 50. Data modified by one or more clients 10 using NFS, direct connection, SAMBA, CIFS, and the like is replicated from one server to another independently of the underlying file system or operating system. Although not shown, the two servers may be connected using a local area network (LAN) or a long-haul network such as the Internet. If one of the two servers fails or is lost in a disaster event, data is safe on the replica server and recovery can be immediate.

In another example, one or more distributed heterogeneous production servers or devices residing on a computer network or network of devices may use the described techniques to replicate data to one or more remote devices or storage backup appliances. As the data on the distributed heterogeneous devices or servers is modified, the devices or servers rely on the described techniques to replicate some or all of the changing data to one or more remote devices, storage backups appliances or remote servers to create an online mirror of data for disaster recovery for high availability purposes or to synchronize device content. The data on the storage backup appliances or remote servers can then be archived to other permanent or temporary storage without impacting the data on the production servers. Embodiments of the invention executing on the remote devices or servers can be temporarily paused to produce a point-in-time snapshot copy of the data on the devices or storage backup appliance.

In another example, it may be desirable to track the data that is changing within a device or that is simply passing through the device and apply the same data changes to one or more other devices in a given configuration: For example, a user may want to keep many computers or devices synchronized in such a way that at the end of each given time period, the content of the computers or devices is the same. The user may use the invention to synchronize storage between many remote devices.

In yet another example, the described techniques may run as an application on an intelligent storage device within a computer. The device may integrate it's own operating system with the described invention or rely on the operating system and the described invention running on the host computer. This device synchronizes itself with other intelligent devices by distributing entire data objects or partial data objects among each other.

In another example, a camera or sensor is attached to a communication device. As the camera or sensor device captures the data, or the data passes through the device, some or all of the data is copied to one or many remote devices using the described techniques. Configuration filters are used to decide what data to distribute.

The hybrid real-time data replication techniques described herein allow data integrity to be preserved while eliminating the limits due to latency and network fault sensitivity imposed by typical synchronous data replication over long haul networks. Additionally, the hybrid real-time data replication techniques may provide particular advantage when employed as a solution for safeguarding data for business continuance and disaster recovery by consolidating backups and building backup appliances. Moreover, the techniques described herein may also advantageously automate content distribution. Consequently, the techniques described herein may reduce the total cost of ownership of an organization's data while offering maximum protection and high availability without substantially impacting performance.

Figure 2:
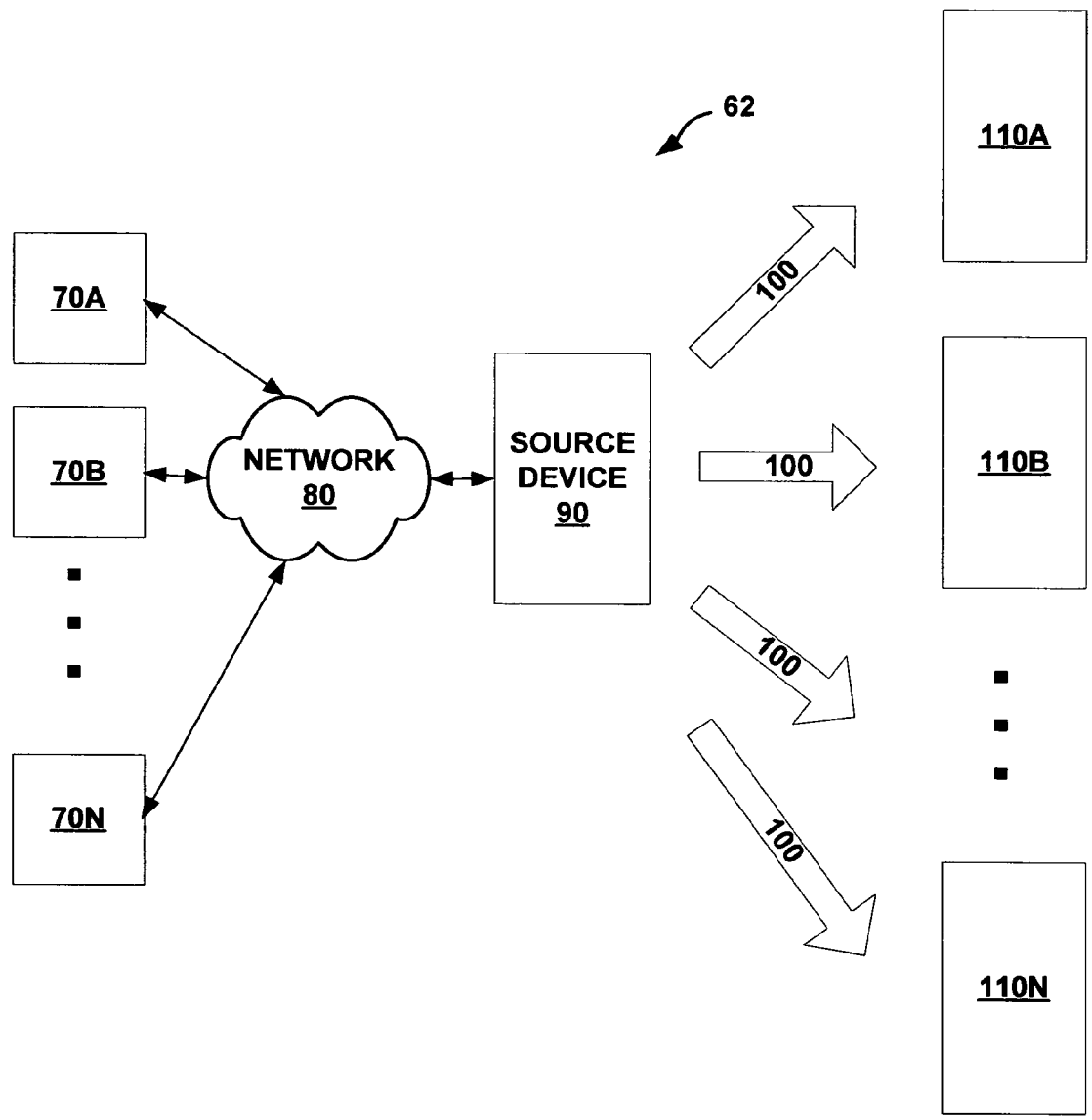
FIG. 2 is a block diagram illustrating hybrid real-time data replication in a single source device and multiple destination devices configuration according to an embodiment of the present invention.

FIG. 2 is a block diagram illustrating another example operating environment 62 in which an example configuration of the present invention is implemented. In the illustrated embodiment, a source device 90 replicates data 100 modified, created, or passed through source device 90 to multiple destination devices 110A-110N, hereafter referred to as multiple destination devices 110. Source device 90 is connected to client devices 70A-70N, hereafter referred to as client devices 70, via network 80.

In general, one or more client devices 70 modifies or creates the content on source device 90 or, alternatively, sends data 100 to another one or more of client devices 70 by passing data 100 through source device 90. The data modifications that occur on source device 90 or pass through source device 90 are replicated to destination devices 110. Specifically, data replication is achieved by capturing all data changes synchronously while performing replication asynchronously. As such, the data replication techniques described herein enable data synchronization and/or distribution of data content from one to one or more similar or dissimilar devices. Alternatively, the data replication techniques described here enable data synchronization and/or distribution of data within the same device.

In the illustrated 1:N configuration, the described hybrid real-time data replication techniques can be used to replicate data from one host to many hosts simultaneously. For example, the techniques described herein may be used by a health care provider to distribute data in real-time from a single host running LINUX to several heterogeneous architectures running LINUX, AIX and Solaris separated by large distances.

Figure 3:
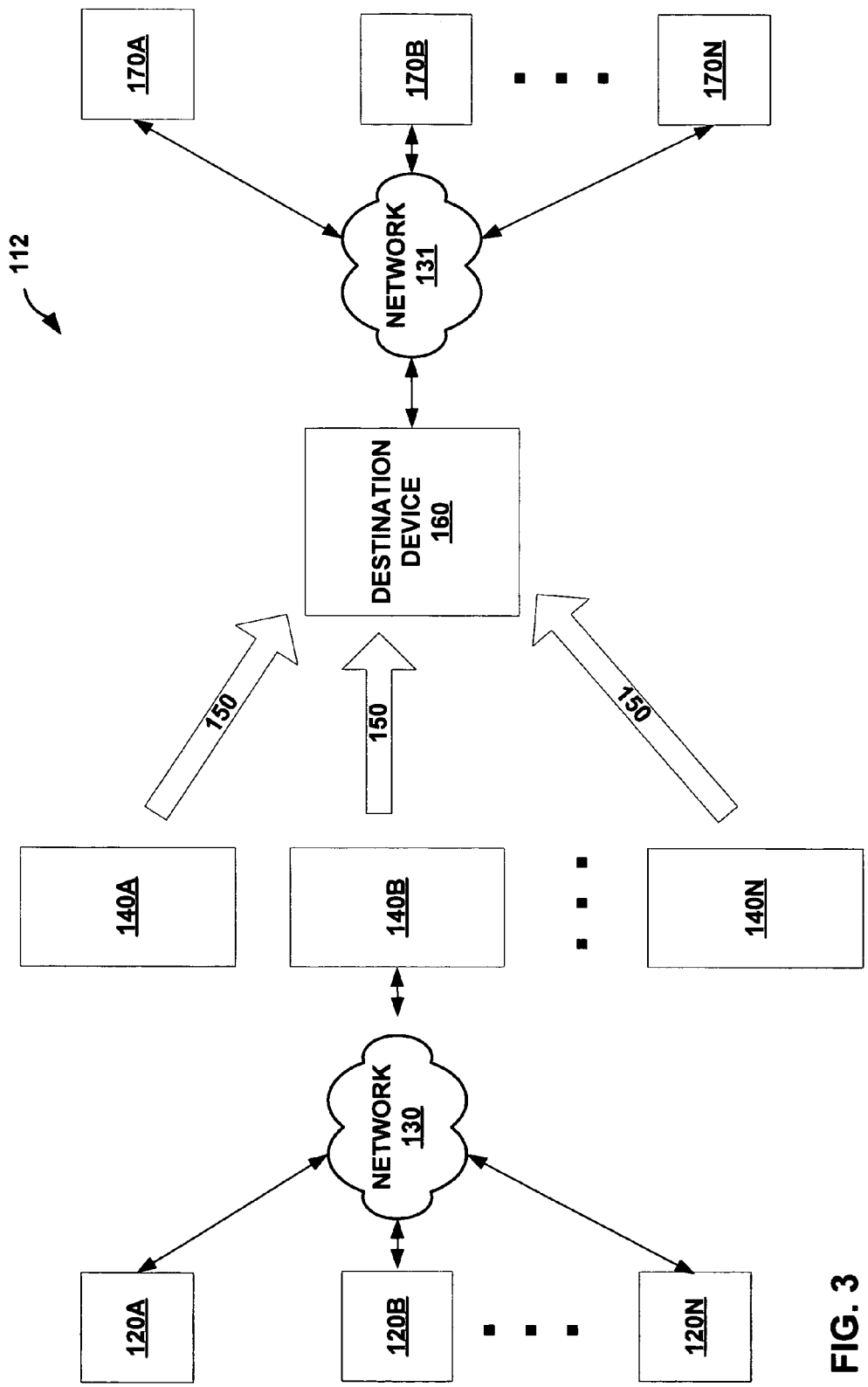
FIG. 3 is a block diagram illustrating hybrid real-time data replication in a multiple source device and a single destination device configuration according to an embodiment of the present invention.

FIG. 3 is a block diagram illustrating an alternative example operating environment 112 in which an example configuration of the present invention is implemented. In the illustrated embodiment, multiple source devices 140A-140N, hereafter referred to as multiple source devices 140, replicate data 150 modified, created, or passed through one or more of multiple source devices 140 to destination device 160. Multiple source devices 140 are connected to client devices 120A-120N, hereafter referred to as client devices 120, via network 130. Destination device 160 is optionally connected to a set of client devices 170A-170N, hereafter collectively referred to as client devices 170, via network 131.

In general, one or more client devices 120 modifies or creates the content on one or more of multiple source devices 140 or, alternatively, sends data 150 to another one or more of client devices 120 by passing data 150 through one or more multiple source devices 140. The data modifications that occur on one or more of multiple source devices 140 or pass through one or more of multiple source devices 140 are replicated to destination device 160.

Consequently, data replication is achieved by capturing all data changes synchronously while performing replication asynchronously. As such, the data replication techniques described herein enable data synchronization and/or distribution of data content from one to one or more similar or dissimilar devices. Alternatively, the data replication techniques described here enable data synchronization and/or distribution of data within the same device.

In the illustrated N:1 configuration, the described hybrid real-time data replication techniques can be used to consolidate backups and build backup appliances. For example, a financial company may construct single and multiple backup appliances that consolidate all backups while keeping the data online for immediate recovery in case of failure of the primary site. In other words, backups from multiple source devices 140 may be consolidated using single destination source 160.

Consequently, the described techniques may reduce the cost associated with backups while allowing the company to schedule backups in any time window while users are using the primary systems. In other words, the described techniques allow automatic online backup that takes place in real-time. Additionally, tape backup can be performed any time of the day. As a result, substantial payroll and good-will dollars may be saved by allowing users to access data in a 24/7 operational environment and by reducing staff overtime previously required to perform backups during off-peak hours.

For expanded security, the same financial company could build a flexible schedule that alternates between a first and a second appliance to create a complete history of the data changes and to give preference to other data traffic on the network. Using the "pause" and "resume" features of the hybrid real-time data replication techniques described herein, the user can suspend replication during designated periods of time. Once replication is resumed, all changes made during the suspended period are replicated to the destination appliances. The hybrid real-time data replication techniques described herein may be configured to provide both temporal and spatial business continuity.

Figure 4:
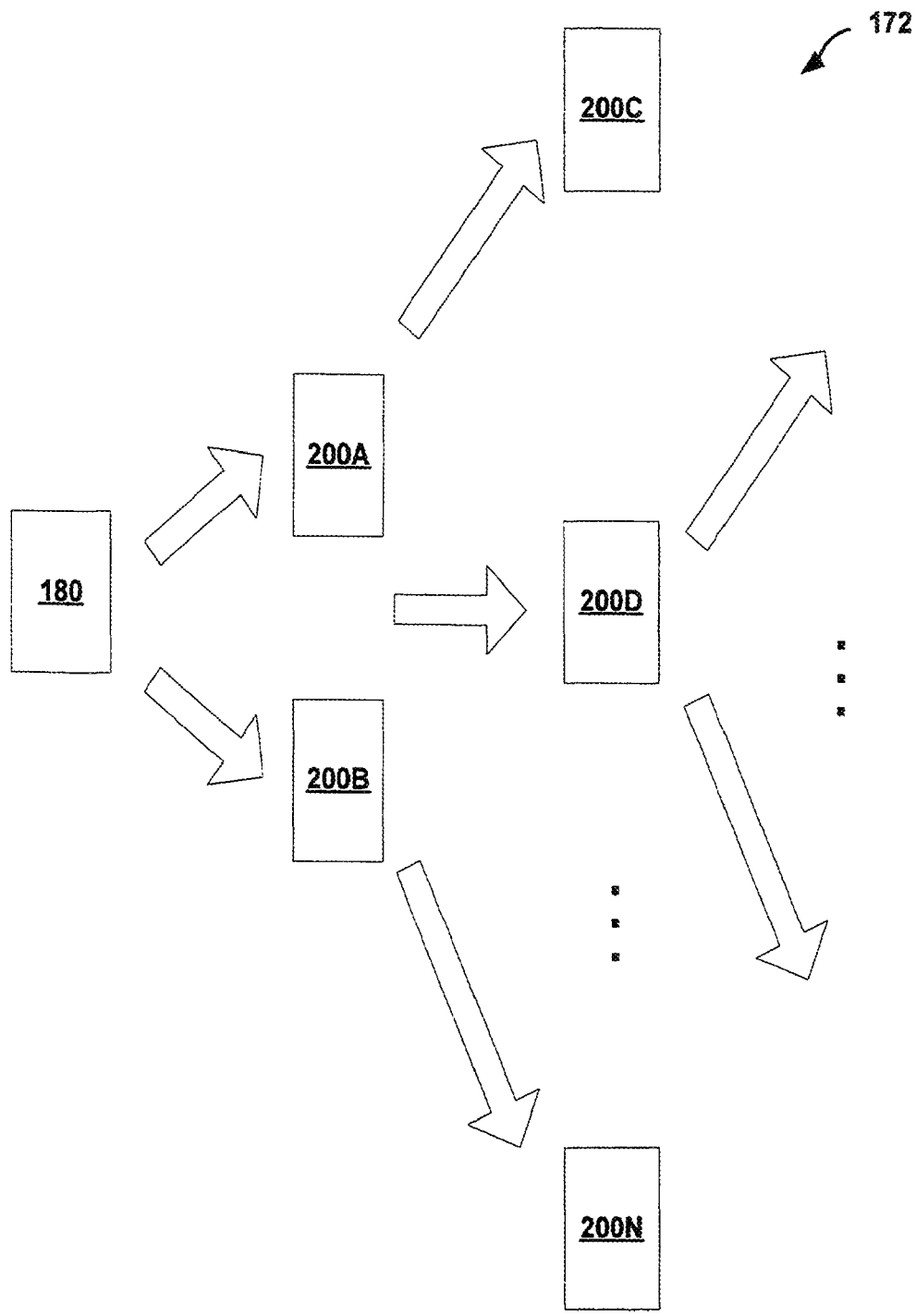
FIG. 4 is a block diagram illustrating hybrid real-time data replication in a cascaded or fan-out single source and multiple destination device configuration according to an embodiment of the present invention.

FIG. 4 is a block diagram illustrating data replication in a cascaded or fan-out single source 180 and multiple destination source device 200 configuration 172 according to an embodiment of the present invention.

Importantly, the described invention is not limited to the previously described configurations. For example, a mesh of 1:1, 1:N, and cascaded configurations may be stored in a single repository (e.g., file) that is centrally managed and distributed to all participants. Local IT managers may retain authoritative administration if they choose.

For example, a consortium of international universities and national laboratories could use the described hybrid real-time data replication techniques to distribute content to each other and protect shared global climate change and biosciences data by replicating among the participating sites. Data collected by scientists at one site would be immediately available to all other sites.

Any analysis or transformations performed on the data by one scientist would be immediately and transparently available across all sites worldwide. For example, data created or modified by scientists in Sydney, Australia may be sent to Seattle and Chicago as well as Madrid, Spain. In a second phase, data may be sent from intermediary hosts to the remaining hosts. Consequently, the described hybrid real-time data replication techniques may be used to streamline and simplify the management of the replication matrix, distribute content in real-time, automate software installations, and ensure business continuity.

Figure 5:
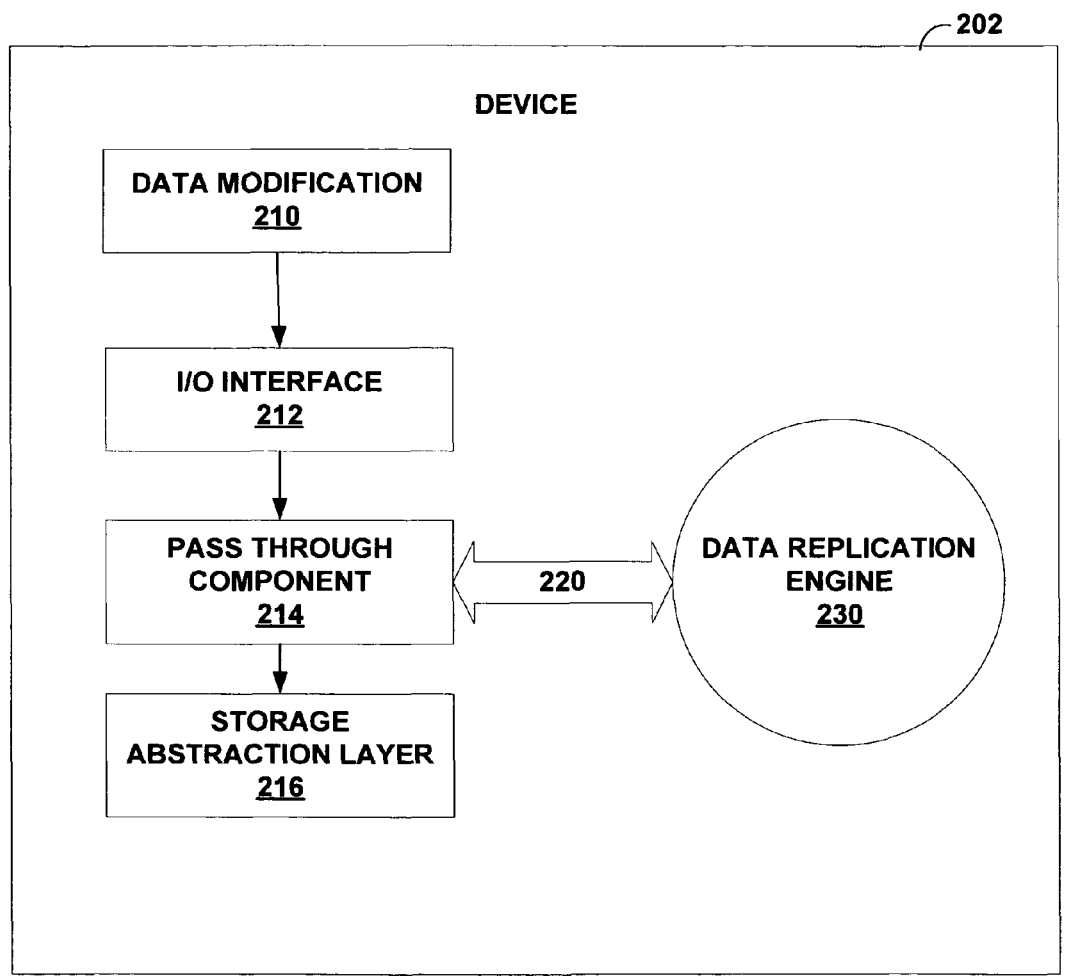
FIG. 5 is a block diagram illustrating an example embodiment of hybrid real-time data replication system according to the present invention.

FIG. 5 is a block diagram illustrating one embodiment of hybrid real-time data replication device 202 according to the present invention. Device 202 includes software components configured to execute as an application on a source device or, alternatively, a destination device. In a preferred embodiment, the source device and the destination device are host computer devices running various versions of UNIX or other operating systems including but not limited to LINUX, Solaris, HP-UX, IBM, and AIX. In the illustrated embodiment, input/output (I/O) interface 212 exists between device 202 and components of a host device or devices in which the invention is embedded. Device 202 comprises pass-through component 214, one or more modification queues 220 (hereafter referred to as modification queues 220), and data replication engine 230. Pass-through component 214, modification queues 220, and data replication engine 230 may be divided into sub-components or combined into a single component without departing from the scope of the invention as described herein.

Pass-through component 214 is inserted between I/O interface 212 of the host device to other client devices and the physical transmission or storage abstraction layers 216 of the host device. As data modification requests 210 pass through pass-through component 214, the data attributes are saved in modification queue 220 for later retrieval by data replication engine 230. Data modification requests 210 are also passed through to storage abstraction layer 216 in order to modify data locally.

Figure 6:
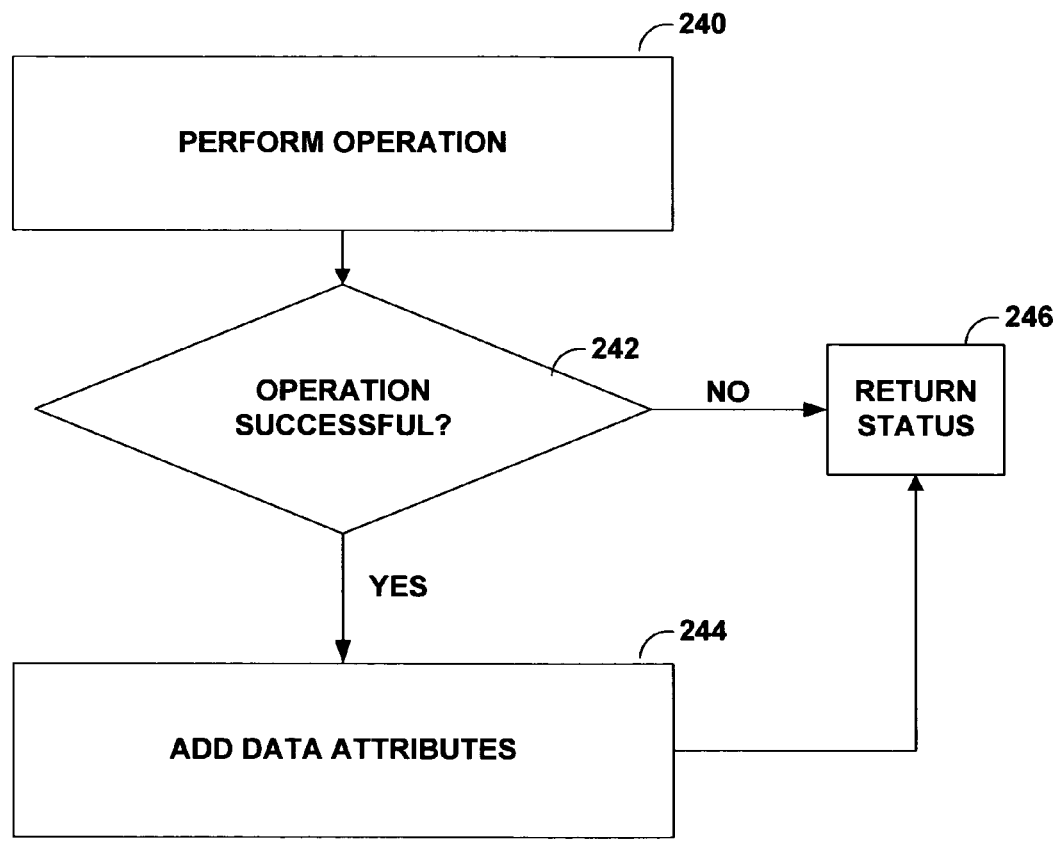
FIG. 6 is a flowchart illustrating an example process of the pass-through component in FIG. 5.

FIG. 6 is a flowchart illustrating an example process of pass-through component 214 (FIG. 5). First, the requested data modification operation is performed (240) and, if the operation is successful (242), the attributes describing the data modification are added (244) to modification queue 220. A return status indicating the successful modification operation is also provided (246). If the modification operation is not successful, a return status indicating the modification failure is provided.

Figure 7:
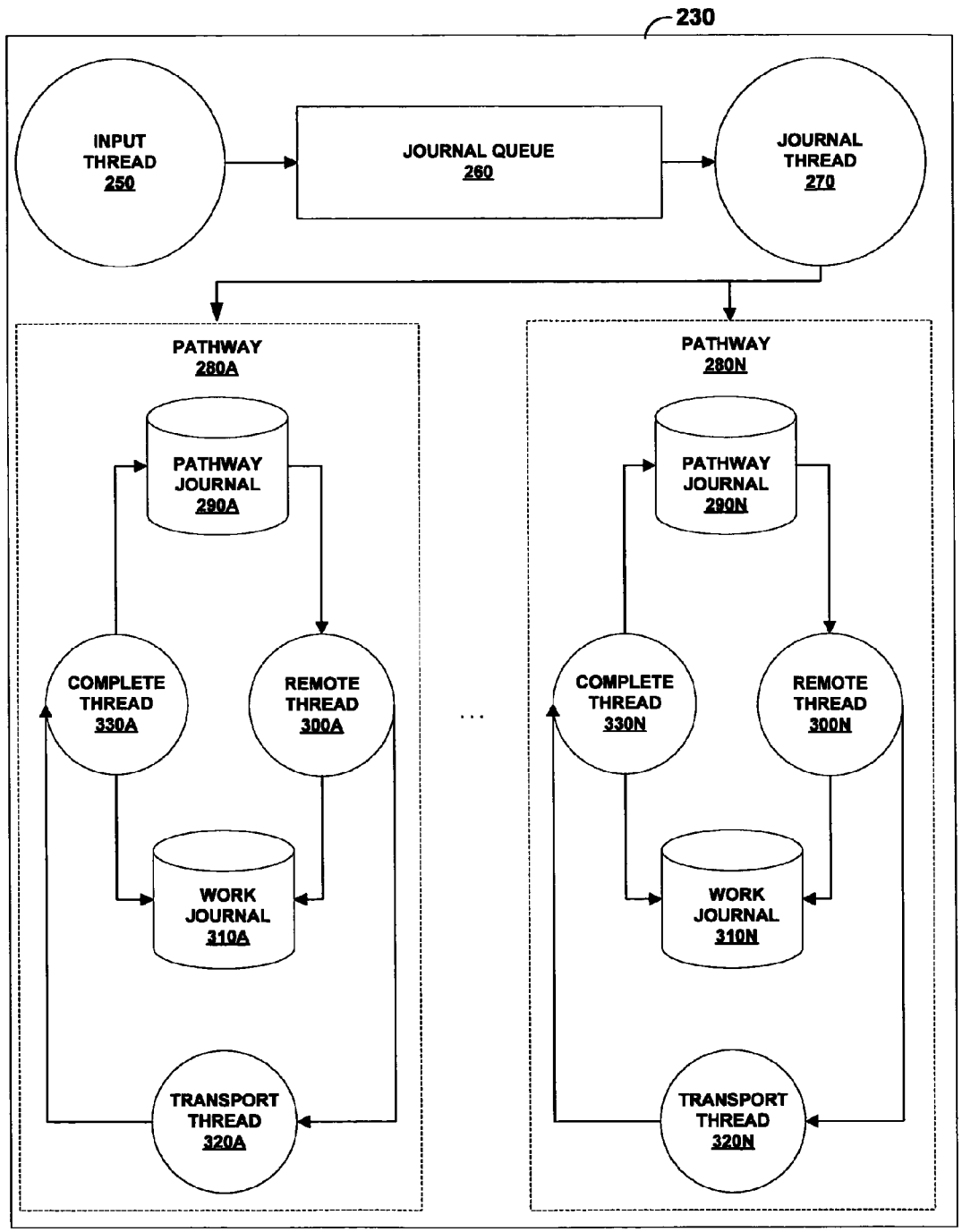
FIG. 7 is a diagram illustrating an example embodiment of the data replication engine in FIG. 5.

FIG. 7 is a diagram illustrating an example embodiment of data replication engine 230 (FIG. 5). Data replication engine 230 has one or more configuration files or configuration commands (not shown). The configuration files or commands include information as to which devices will receive data, what data to replicate, when to suspend replication, when to resume replication, and other such replication policies. Data replication engine 230 has one or more replication pathways 280A-280N, hereafter referred to collectively and individually as pathways 280. Data replication engine 230 includes input thread 250, journal thread 270, complete threads 330A-330N, remote threads 300A-300N, and transport threads 320A-320N that execute concurrently to perform data replication functions. Each pathway 280 includes a corresponding one of complete threads 330A-330N, remote threads 300A-300N, and transport threads 320A-320N. Additionally, each pathway 280 includes a corresponding one of pathway journals 290A.

Input thread 250 retrieves modification attributes from modification queue 220 (FIG. 5) of pass-through component 214 (FIG. 5) and stores the attributes on journal queue 260. Concurrently, journal thread 270 retrieves attributes from journal queue 260 and inserts each attribute, or item, into each pathway journal 290A-290N of pathways 280. Journal thread 270 also increments the reference count of the item if a given item is already present in journal queue 260.

Within each pathway 280, remote threads 300A-300N concurrently retrieve items from the corresponding pathway journals 290A-290N. If a given item is not already present in work journals 310A-310N, the item is stored in work journals 310A-310N and passed to transport threads 320A-320N. If the item is already present in work journals 310A-310N, a reference count for that item is incremented. When transport threads 320A-3320N have completed replicating the data represented by the attribute item, it passes the item to complete threads 330A-330N. The item is deleted from work journals 310A-310N by complete threads 330A-330N and if the reference count in pathway journals 290A-290N is zero, the item is also removed from pathway journals 290A-290N. Those skilled in the art of software design will realize that using another number of threads, concurrent, serial, or parallel components may be used without departing from the scope of the invention as described herein.

Figure 8:
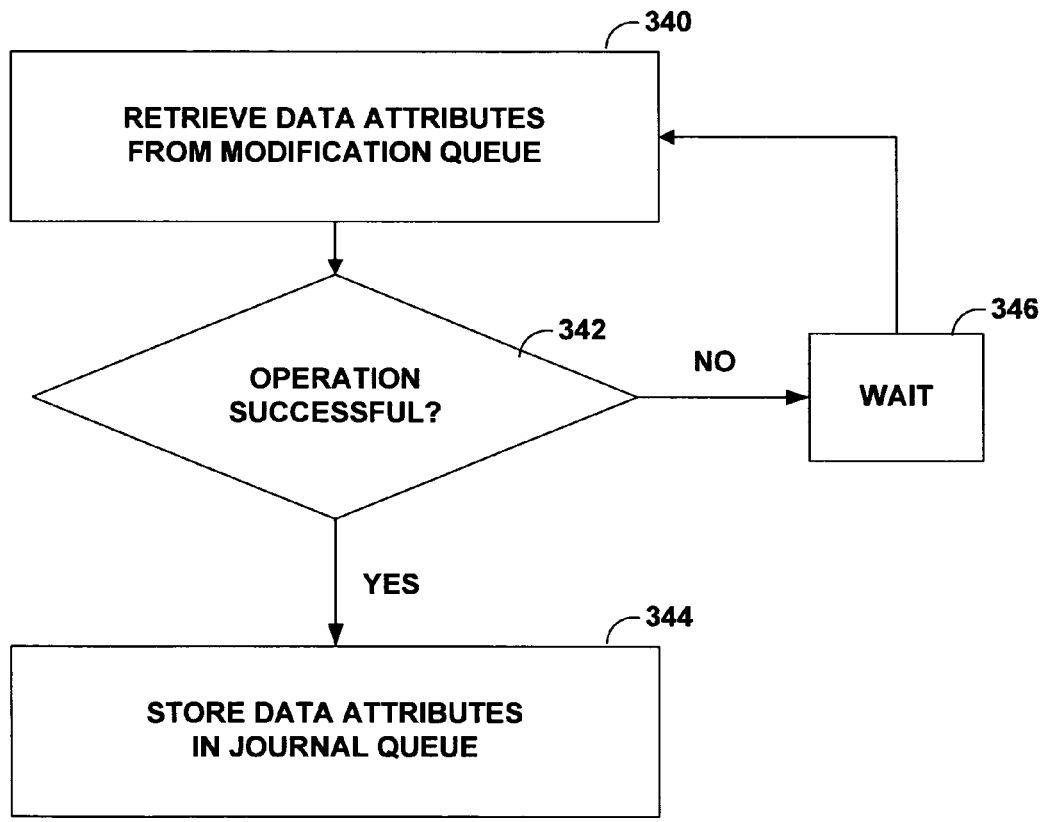
FIG. 8 is a flowchart illustrating an example process of the input thread in FIG. 7.

FIG. 8 is a flowchart illustrating an example process of input thread 250 (FIG. 7). First data attributes are retrieved (340) from modification queue 220 (FIG. 5) used by pass-through component 214 (FIG. 5). If an item was successfully retrieved (342), the item is stored in journal queue 260 (344). If the item was not successfully retrieved, input thread 250 waits (346) for more items to become available and attempts to retrieve another item (340).

Figure 9:
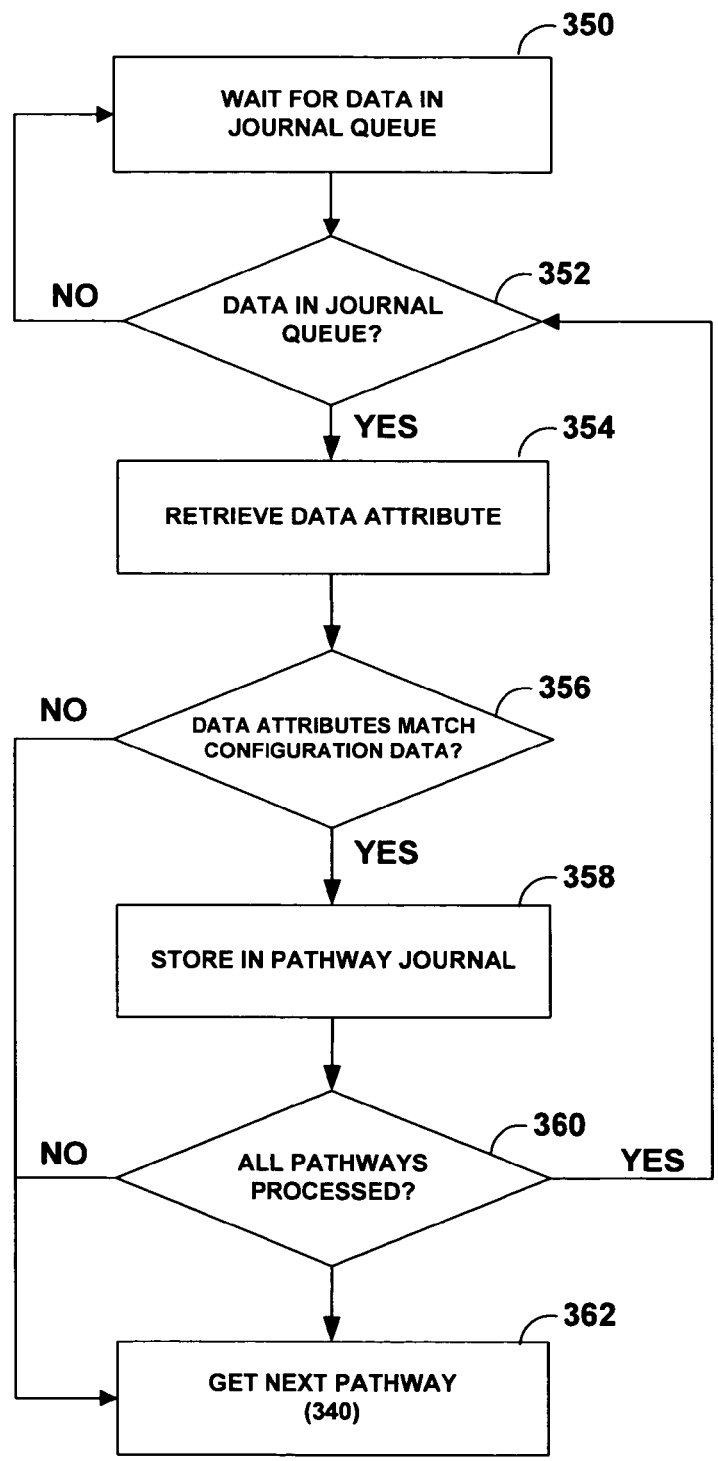
FIG. 9 is a flowchart illustrating an example process of the journal thread in FIG. 7.

FIG. 9 is a flowchart illustrating an example process of journal thread 270 (FIG. 7). If data is not present in journal queue 260 (352), journal thread 270 waits for data in journal queue 260 (350). If data is present in journal queue 260, the first data attribute, or item, is retrieved (354). For each configured pathway 280 (FIG. 7), the retrieved data item is compared against configuration data for that pathway 280 (356). If the data attribute matches the configuration data for the particular pathway 280 (FIG. 7), the data attribute is stored in the corresponding one of pathway journals 290A-290N (358). If each of pathways 280 (FIG. 7) has been processed (360), journal thread 270 searches for data in journal queue 260. If each of pathways 280 (FIG. 7) has not been processed (360), the process is performed on the next pathway 280 (362).

Figure 10:
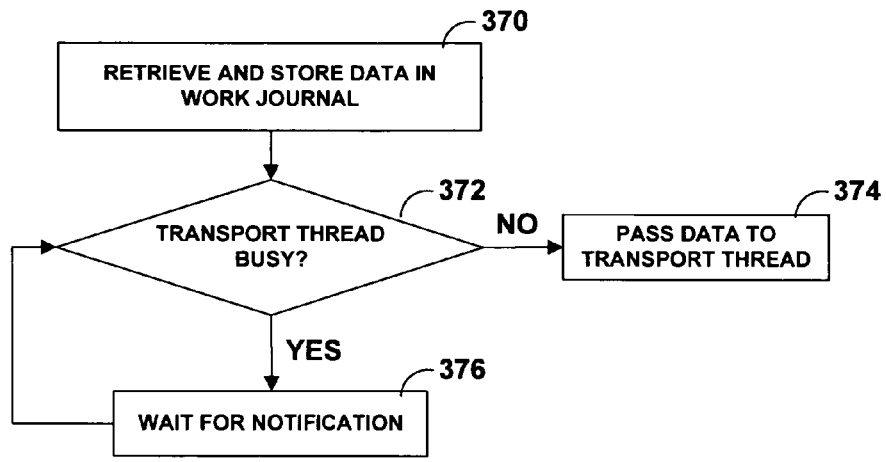
FIG. 10 is a flowchart illustrating an example process of a remote thread in FIG. 7.

FIG. 10 is a flowchart illustrating an example process of remote threads 300A-300N (FIG. 7) within each pathway 280 (FIG. 7). When data replication is not suspended and data is present in the corresponding one of pathway journals 290A-290N (FIG. 7), the data is retrieved and stored within the corresponding one of work journals 310A-310N (370). If the corresponding one of transport threads 320A-320N (FIG. 7) is not busy (372), the data is sent to the appropriate transport thread (374). If corresponding one of transport threads 320A-320N (FIG. 7) is busy (372), the data replication waits for notification (376) from the appropriate transport thread that it will accept further input.

Figure 11:
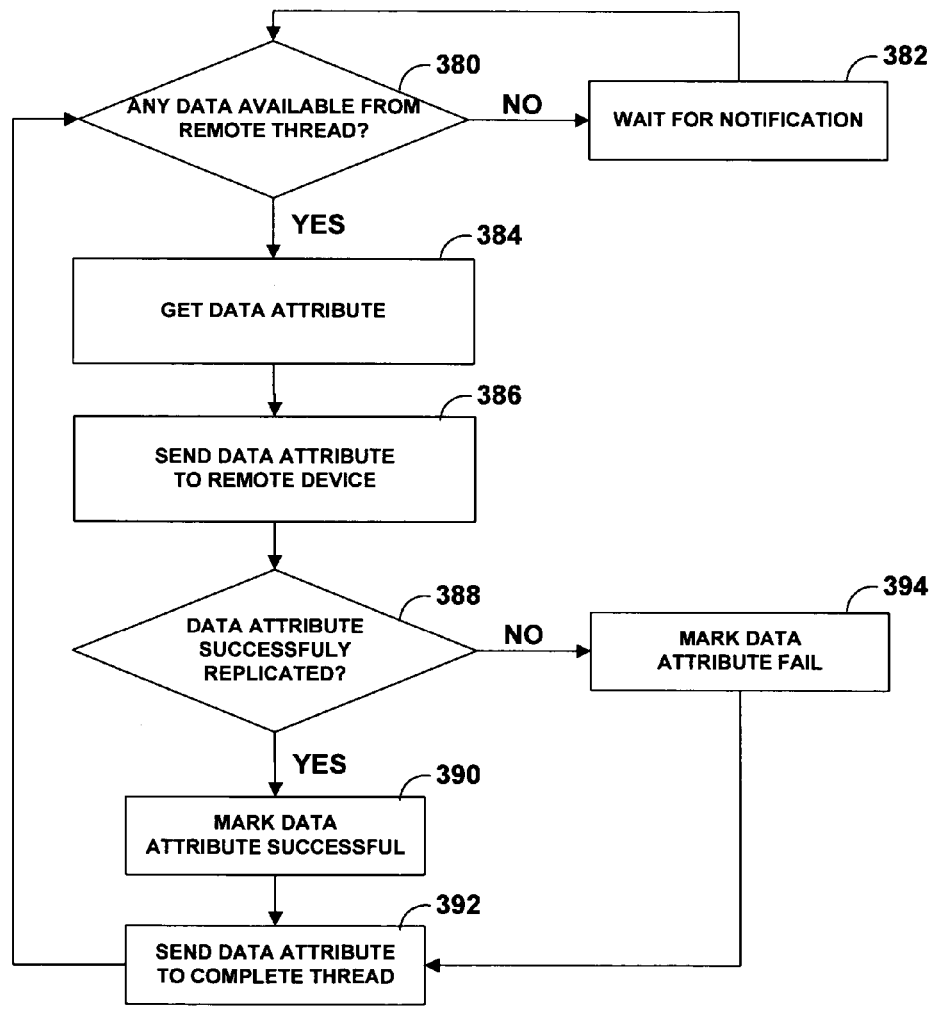
FIG. 11 is a flowchart illustrating an example process of a transport thread in FIG. 7.

FIG. 11 is a flowchart illustrating an example process of transport threads 320A-320N (FIG. 7) within each pathway 280 (FIG. 7). If data is not available (380) from the corresponding one of remote threads 300A-300N (FIG. 7), the corresponding one of transport threads 320A-320N (FIG. 7) waits for notification that data is available (382). When data is available from the appropriate remote thread (FIG. 7), that data is retrieved (384) and sent to a remote device (386). If the replication of data was successful (388), the data item is marked as successful (390) and sent (392) to the corresponding one of complete data threads 330A-330N (FIG. 7). If the replication of data was not successful, the data item is marked as failed (394). After a data attribute is marked, the data is sent to the appropriate one of complete threads 330A-330N (FIG. 7) and the corresponding transport thread 320A-320N (FIG. 7) check is more data is available (380). Transport threads 320A-320N (FIG. 7) negotiate with corresponding remote threads 310A-310N (FIG. 7) over what compression methods and level to use (not shown). Transport threads 320A-320N (FIG. 7) monitor the transfer rates and change the compression methods and level to obtain increased transfer rates or reduced rates according to the policy in the configuration (not shown).

Figure 12:
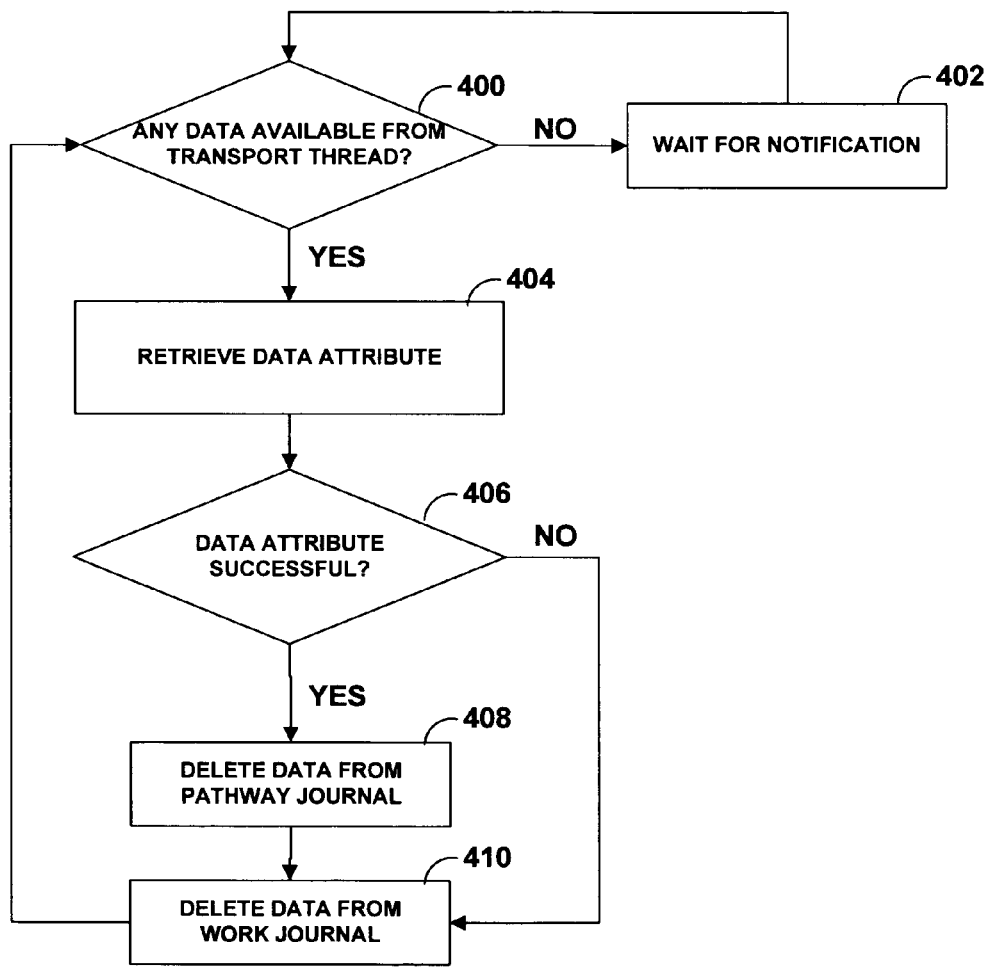
FIG. 12 is a flowchart illustrating an example process of a complete thread in FIG. 7.

FIG. 12 is a flowchart illustrating an example process of complete threads 330A-330N (FIG. 7) within each pathway 280 (FIG. 7). If data is not available (400) from the corresponding one of transport threads 320A-320N (FIG. 7), then the corresponding one of complete threads 330A-330N (FIG. 7) waits for notification that data is available (402). When data is available, from the appropriate transport thread (FIG. 7), the data is retrieved (404). If the appropriate one of transport threads 320A-320N (FIG. 7) marked the data as successful (406), the data is deleted (408) from the corresponding one of pathway journals 290A-290N (FIG. 7). The data is then deleted (410) from the corresponding one of work journals 310A-310N (FIG. 7). When the appropriate one of transport threads 320A-320N (FIG. 7) did not mark the data as successful, the data is deleted from the corresponding one of work journals 310A-310N (FIG. 7).

The described hybrid real-time data replication techniques may use a general-purpose computing system that is well known in the art for an operating environment in which the described invention may be implemented. The operating environment is only one example of a suitable operating environment, and should not be taken as limiting the use or functionality of the described invention. Other well-known computing systems, environments and/or configurations that may be suitable for use with the invention include, but are not limited to, personal computers, server computers, hand-held or laptop devices, multiprocessor systems, microprocessor-based systems, programmable consumer electronics, network personal computers (PCs), minicomputers, mainframe computers, distributed computing environments the include any of the above systems or devices or other environments.

If implemented in software, a machine-readable or computer-readable medium may store computer readable instructions, i.e., program code, that can be executed by a processor to carry out one of more of the techniques described above. For example, the machine-readable or computer-readable medium may comprise random access memory (RAM), read-only memory (ROM), non-volatile random access memory (NVRAM), gate arrays, electrically erasable programmable read-only memory (EEPROM), flash memory, compact disk-ROM (CD-ROM), digital versatile disks (DVD) or other optical storage, magnetic cassettes, magnetic tape or other magnetic storage devices, or any other medium which can be used to store the desired information and which can be accessed by processing devices. The machine-readable or computer-readable medium may comprise computer readable instructions that when executed, cause the device to carry out one or more of the techniques described herein. These and other embodiments are within the scope of the following claims.

The invention claimed is:

1. A data-replication method comprising:
   for each source device in at least one source device, synchronously capturing data modifications, the synchronously capturing comprising, in real time:
      receiving, at the source device from a client device, a request to modify data;
      modifying the data based on the request; and
      saving data attributes of the modified data to a modification queue of the source device, the modification queue comprising data attributes of synchronously-captured data modifications that have not been retrieved for replication;
   for each source device in the at least one source device, asynchronously replicating the data modifications at least one destination device that is remote from the source device, the asynchronously replicating comprising:
      retrieving the data attributes from the modification queue;
      saving the data attributes of the modified data in a journal queue on the source device for replication to the at least one destination device;
      retrieving the data attributes from the journal queue;
      comparing the data attributes against configuration data for each of at least one pathway, each of the at least one pathway corresponding to one of the at least one destination device; and
      for each data attribute of the data attributes and each of the at least one pathway, inserting the data attribute into a corresponding one of at least one pathway journal if the data attribute matches the configuration data for the pathway.

2. The method of claim 1, the method comprising saving a status of the modifying of the data.

3. The method of claim 2, wherein the saving of data attributes is performed if the status indicates that the modifying of the data was successful.

4. The method of claim 2, the method comprising communicating the status of modifying the data if the client device requests that the status be communicated.

5. The method of claim 1, wherein the asynchronously replicating comprises:
   retrieving the data attributes from each of the at least one pathway journal;
   inserting the data attributes into at least one work journal for transmission to the at least one destination device, the at least one work journal corresponding to the at least one pathway journal; and
   sending content described by the data attributes to the at least one destination device.

6. The method of claim 1, the method comprising suspending the asynchronously replicating while continuing the synchronously capturing of data modifications.

7. The method of claim 5, wherein the asynchronously replicating comprises indicating each of the data attributes as successful or failed depending on whether the asynchronously replicating was a success or a failure for that data attribute.

8. The method of claim 1, wherein:
   the at least one source device comprises a plurality of source devices distributed throughout a network; and
   each of the plurality of source devices asynchronously replicates data modifications at the at least one destination device.

9. The method of claim 1, wherein the at least one destination device comprises a plurality of destination devices and the at least one source device asynchronously replicates the data modifications to selected ones of the plurality of destination devices.

10. A device for replication of data across a distributed computing system, the device comprising:
at least one computer-readable storage medium; and
a processor with data access to the at least one computer-readable storage medium, the processor executing instructions to:
for each source device in at least one source device, synchronously capture data modifications, the synchronous capture comprising, in real time:
receipt, at the source device from a client device, of a request to modify data;
modification of the data based upon the request; and
saving of data attributes of the modified data to a modification queue of the source device in the at least one computer-readable storage medium, the modification queue comprising data attributes of synchronously-captured data modifications that have not been retrieved for replication;
for each source device in the at least one source device, asynchronously replicate the data modifications at least one destination device that is remote from the source device, the asynchronous replication comprising:
retrieval of the data attributes from the modification queue;
saving of the data attributes of the modified data in a journal queue on the source device in the at least one computer-readable storage medium for replication to the at least one destination device;
retrieval of the data attributes from the journal queue;
comparison of the data attributes against configuration data for each of at least one pathway, each of the at least one pathway corresponding to one of the at least one destination device; and
for each data attribute of the data attributes and each of the at least one pathway, insertion of the data attribute into a corresponding one of at least one pathway journal if the data attribute matches the configuration data for the pathway.

11. The device of claim 10, wherein the processor executes instructions to save a status of the modification of the data.

12. The device of claim 11, wherein data attributes of the modified data are saved to a modification queue of the at least one source device if the status indicates that the modification of the data into the modified data was successful.

13. The device of claim 11, wherein the processor executes instructions to communicate the status if the client device requests that the status be communicated.

14. The device of claim 10, wherein the asynchronous replication comprises:
retrieval of the data attributes from each of the at least one pathway journal;
insertion of the data attributes into at least one work journal for transmission to the at least one destination device, the at least one work journal corresponding to the at least one pathway journal; and
sending of content described by the data attributes to the at least one destination device.

15. The device of claim 10, wherein the processor executes instructions to suspend the asynchronous replication while continuing the synchronous capture of data modifications.

16. The device of claim 14, wherein the asynchronous replication comprises indication of each of the data attributes as successful or failed depending on whether the asynchronous replication was a success or a failure for that data attribute.

17. The device of claim 10, wherein:
the at least one source device comprises a plurality of source devices distributed throughout a network; and
each of the plurality of source devices asynchronously replicates data modifications at the at least one destination device.

18. The device of claim 10, wherein the at least one destination device comprises a plurality of destination devices and the at least one source device asynchronously replicates the data modifications to selected ones of the plurality of destination devices.

19. A computer-readable medium comprising instructions for causing a programmable processor to:
synchronously intercept data modifications from a client device, the interception comprising saving data attributes of the modified data to a modification queue of a source device, the modification queue comprising data attributes of synchronously-intercepted data modifications that have not been retrieved for replication;
asynchronously replicate the data modifications at one or more destination devices that are remote from the source device, the asynchronous replication comprising:
creation of a thread that retrieves data attributes representative of the data modifications from the modification queue and stores the data attributes in a journal queue for replication to the one or more destination devices;
creation of a thread that retrieves the data attributes from the journal queue and inserts each of the data attributes into at least one pathway journal, the at least one pathway journal corresponding to at least one pathway, each of the at least one pathway corresponding to one of the one or more destination devices;
for each of the at least one pathway:
creation of a thread that retrieves the data attributes stored in the pathway journal and inserts the data attributes into a work journal for transmission to the one or more destination devices;
creation of a thread that receives the data attributes retrieved from the pathway journal and replicates data represented by the data attributes retrieved from the pathway journal to one of the one or more destination devices; and
creation of a thread that removes the data attributes stored in the work journal and the pathway journal if a reference count for the data attribute is zero;
wherein the asynchronous replication comprises data synchronization.

20. A method for data replication, the system comprising:
arranging a plurality of devices in a cascading configuration, the cascading configuration comprising a configuration that fans out from a single source to multiple destinations;
at a first device in the cascading configuration, synchronously capturing data modifications, the synchronously capturing comprising:
receiving, from a client device, a request to modify data;
modifying the data based on the request; and
saving data attributes of the modified data to a modification queue, the modification queue comprising data attributes of synchronously-captured data modifications that have not been retrieved for replication;

asynchronously replicating the data modifications at one or more devices directly subsequent to the first device in the cascading configuration, the one or more devices being remote from the first device, the asynchronously replicating comprising:
  retrieving the data attributes from the modification queue;
  for each data attribute of the data attributes and each of at least one pathway, inserting the data attribute into a corresponding one of at least one pathway journal;
  wherein each of the at least one pathway corresponds to one of the one or more devices directly subsequent to the first device; and
for each device in the cascading configuration, at some point after the data modifications are replicated on the device, repeating the asynchronously replicating on any directly subsequent devices in the cascading configuration.

21. A data-replication method comprising:
for each source device in at least one source device, synchronously capturing data modifications, the synchronously capturing comprising, in real time:
  receiving, at the source device from a client device, a request to modify data;
  modifying the data based on the request; and
  saving data attributes of the modified data to a modification queue of the source device, the modification queue comprising data attributes of synchronously-captured data modifications that have not been retrieved for replication;
for each source device in the at least one source device, asynchronously replicating the data modifications at least one destination device that is remote from the source device, the asynchronously replicating comprising:
  creating a thread that retrieves the data attributes from the modification queue; and saves the data attributes of the modified data in a journal queue on the source device for replication to the at least one destination device;
  creating a thread that retrieves the data attributes from the journal queue and inserts each of the data attributes into at least one pathway journal, the at least one pathway journal corresponding to at least one pathway, each of the at least one pathway corresponding to one of the one or more destination devices;
  for each of the at least one pathway:
    creating a thread that retrieves the data attributes stored in the pathway journal and inserts the data attributes into a work journal for transmission to the one or more destination devices;
    creating a thread that receives the data attributes retrieved from the pathway journal and replicates data represented by the data attributes retrieved from the pathway journal to one of the one or more destination devices; and
    creating a thread that removes the data attributes stored in the work journal and the pathway journal if a reference count for the data attribute is zero; and
  wherein the asynchronously replicating comprises data synchronization.

* * * * *